US006987728B2

(12) United States Patent
Deshpande (10) Patent No.: US 6,987,728 B2
(45) Date of Patent: Jan. 17, 2006

(54) BANDWIDTH ALLOCATION SYSTEM (75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 839 days.

(21) Appl. No.: 09/768,844

(22) Filed: Jan. 23, 2001

(65) Prior Publication Data
US 2002/0126698 A1 Sep. 12, 2002

(51) Int. Cl.
*G08C 15/00* (2006.01)

(52) U.S. Cl. ...................................... 370/229; 370/468

(58) Field of Classification Search ................ 714/748, 714/752, 786, 820, 822; 370/473, 477, 468, 370/467, 436, 432, 229, 216
See application file for complete search history.

(56) References Cited

U.S. PATENT DOCUMENTS

| 5,506,844 | A | 4/1996 | Rao |
|---|---|---|---|
| 5,515,377 | A | 5/1996 | Horne et al. |
| 5,708,664 | A | 1/1998 | Budge et al. |
| 5,793,425 | A | 8/1998 | Balakrishnan |
| 5,802,106 | A | 9/1998 | Packer |
| 5,854,658 | A | 12/1998 | Uz et al. |
| 5,861,919 | A | 1/1999 | Perkins et al. |
| 5,862,140 | A | 1/1999 | Shen et al. |
| 5,877,812 | A | 3/1999 | Krause et al. |
| 5,956,088 | A | 9/1999 | Shen et al. |
| 5,966,120 | A | 10/1999 | Arazi et al. |
| 5,973,739 | A | 10/1999 | Nilsson |
| 6,005,620 | A | 12/1999 | Yang et al. |
| 6,011,590 | A | 1/2000 | Saukkonen |
| 6,023,456 | A | 2/2000 | Chapman et al. |
| 6,052,384 | A | 4/2000 | Huang et al. |
| 6,058,109 | A | 5/2000 | Lechleider |
| 6,075,768 | A | 6/2000 | Mishra |
| 6,215,766 | B1 * | 4/2001 | Ammar et al. ............... 370/229 |
| 6,594,798 | B1 * | 7/2003 | Chou et al. .................. 714/820 |
| 6,633,585 | B1 * | 10/2003 | Ghanwani et al. ........... 370/468 |
| 2003/0012279 | A1 * | 1/2003 | Chaddha ................ 375/240.12 |
| 2003/0140159 | A1 * | 7/2003 | Campbell et al. ............ 709/231 |

OTHER PUBLICATIONS

McCanne et al., Receiver-driven Layered Multicast, Proc. of ACM SIGCOM '96, Aug. 1996, Stanford, CA.
McCanne et al., Low-complexity Video Coding for Receiver-driven Layered Multicast, IEEE Journal on Selected Areas in Communications, Aug. 1997, vol. 15, No. 6, pp. 983-1001, IEEE, USA.
Li et al., Layered Video Multicast with Retransmission (LVMR): Evaluation of Error Recovery Schemes, Proceedings of NOSSDAV, May 1997, USA.
The Network Simulator—ns-2, http://www.isi.edu/nsnam/ns/.

(Continued)

*Primary Examiner*—Wellington Chin
*Assistant Examiner*—John Shew
(74) *Attorney, Agent, or Firm*—Chernoff, Vilhauer, McClung & Stenzel (57) ABSTRACT

Layered multicast provides a method of optimizing the reception data rate for a plurality of networked push media receivers having heterogeneous reception bandwidth. To reduce the latency of a pull medium element during multi-media event, the data rates for push media layers are reduced during transmission of the pull medium. Further, a recently added layer of the push medium is dropped when the transmission of the push medium is initiated and attempts of the receiver to subscribe to a higher push medium layer are suppressed during pull medium reception.

21 Claims, 3 Drawing Sheets

OTHER PUBLICATIONS

Schulzrinne et al., RTP: A Transport Protocol for Real-Time Applications, Internet Engineering Task Force, Jan. 2000.

Reibman et al., Constraints on Variable Bit-Rate Video for ATM Networks, IEEE Trans. on Circuits and Systems for Video Technology, Dec. 1992, vol. 2, No. 4, , IEEE.

Keesman et al., Analysis of Joint Bit-Rate Control in Multi-Program Image Coding, SPIE, 1994, vol. 2308, pp. 1906-1917.

Balakrishnan et al., Global Optimization of Multiplexed Video Encoders, ICIP, 1997, pp. 377-380, IEEE, USA.

Tao et al., A Rate-Quantization Model for MPEG Encoders, ICIP, 1997, pp. 338-341, IEEE.

Lee et al., A Scene Adaptive Bitrate Control Method in MPEG Video Coding, SPIE, 1997, vol. 3024, pp. 1406-1416.

Choi et al., Fast Piecewise Linear Approximation of Rate-Distortion Functions For MPEG Video, SPIE, 1997, vol. 3024, pp. 1382-1393.

Ribas-Corbera et al., Rate Control in DCT Video Coding for Low-Delay Communications, IEEE Trans. on Circuits and Systems for Video Technology, Feb. 1999, vol. 9, No. 1, pp. 172-185.

Video Codec Test Model, Near-Term, Version 10 (TMN10) Draft 1, ITU—Telecommunications Standardization Sector, Study Group Apr. 16, 1998, Finland.

* cited by examiner

BANDWIDTH ALLOCATION SYSTEM

CROSS-REFERENCE TO RELATED APPLICATIONS

Not applicable.

BACKGROUND OF THE INVENTION

The present invention relates to presentation of multimedia events over a data processing network and, more particularly, to server side allocation of network bandwidth during a multimedia session comprising a layered encoded, multicast, push source and a pull source intended for multiple receivers having heterogeneous reception bandwidth.

The increased capacity and speed of the Internet and local network access have increased the practicality and popularity of delivering video conferencing, presentations, and other multimedia events over the Internet. On the other hand, the character of multimedia events and the structure of the Internet makes Internet delivery of multimedia events problematic. First, a multimedia event comprises several program elements or media, each characterized by its own qualities, delivery mechanism, and priority or importance to the presentation. Typically, a multimedia event includes audio and video, but it may also include image, text, and data elements. The various media may be classified as either a push medium where a server controls the flow and rate of data transfer or a pull medium where the data transfer rate is controlled by a client. An example of a pull medium is the HyperText Transfer Protocol (HTTP) used to transfer images, text, and, in some cases, data on the Internet. Typically, the presentation of images, text, and data is discontinuous during a multimedia session, but the priority of the data transfer is high, reliable delivery is desirable, and the bandwidth for the transmission can vary. Real-time audio and video data are typically transmitted through a multicast architecture as push media. The push media protocols include the Real-Time Transport (RTP) protocol and the SGI (Silicon Graphics Inc.) MediaBase protocol used primarily for video-on-demand services. RTP typically operates over the User Datagram Protocol (UDP). While video has a relatively low priority, the priority of audio is high. Presentation of both audio and video is typically continuous and data rates are relatively high. While RTP/UDP provides receivers with information such as the payload type and a time stamp for reconstructing the data in real time, it does not provide any quality of service guarantees. Taken together, the elements of a multimedia event generate high data rates that can vary substantially during a session.

A multimedia event is also commonly an event of interest to multiple receivers and the audio and video elements are typically multicast. Multicasting enables a source to send data packets to a special multicast IP (Internet Protocol) group address that identifies a group of interested receivers. Receivers that have joined the appropriate multicast group can read the data sent to the group address. Multicasting permits a single data stream to be distributed to a number of receivers without a substantial increase in the bandwidth over that required to transmit the data to a single receiver. While the bandwidth at the source may be more than adequate for the multimedia event, the Internet is heterogeneous, comprising many connected networks, and the reception bandwidth (the bandwidth of the communication channel between a source and an individual receiver) can vary substantially between individual receivers of the multimedia event. In addition, the reception bandwidth can vary substantially over time for a particular receiver. The differences in reception bandwidth available to individual receivers means that transmission of the multimedia data at a single data rate is unlikely to be satisfactory to many of the receivers of the multicast. Allocating data rates for a plurality of media so as to preserve the integrity and character of a multimedia event and maximize the data rate at each receiver, while avoiding network congestion and data loss, is a difficult problem.

A solution to the problem of heterogeneous reception bandwidth for multicast push media is the use of layered multicast combining layered data compression and heterogeneous multipoint communication. Data is encoded in several layers that can be incrementally combined when the medium is reconstructed at the receiver to provide progressively higher levels of quality of the reconstructed medium. For example, for video a base layer is encoded at a data rate that will not exceed a minimum threshold bandwidth but produce video of minimally acceptable quality at the receiver. Each additional layer improves the quality of the reconstructed video at the expense of a higher data rate. Layered multicast can be used with any push medium but is most useful for encoding video. The hierarchical dependence of the layers means that the base layer is more important than higher layers.

The multicast server simultaneously transmits the several hierarchically layered data streams to several multicast group addresses. A receiver can tune the quality of the reconstructed medium to its available reception bandwidth by adding or dropping layers from its reception. One protocol used to control layer subscription for layered multicast is the Receiver-driven Layered Multicast (RLM) protocol. Packet loss is used to determine when the receiver is over subscribed. If packet loss greater than a specified threshold is detected over a time interval known as the detection time the receiver drops the highest layer to which it is subscribed. On the other hand, in the absence of significant packet loss, a receiver will periodically experiment by joining a higher layer group until the receiver detects a significant packet loss.

While layered multicast provides a bandwidth allocation solution for push media such as video and audio, pull media, such as images, text, and data, are often important to a meaningful multimedia event and layered multicast does not provide a method of allocating bandwidth when both pull and push media are being transmitted. What is desired, therefore, is a method of allocating bandwidth during a multimedia session comprising a pull medium and a layered push medium that is multicast over a network to clients having heterogeneous reception bandwidth.

DETAILED DESCRIPTION OF THE INVENTION

A data processing network comprises a collection of systems or nodes connected by communication links over which information can be transferred between end systems. End systems are the devices that permit users to remotely access information over the network. Network applications are typically designed so that one computer or end system acts as a server managing network traffic and providing services and data to other end systems or clients attached to the network. On the other hand, network applications can provide for peer-to-peer operation where end systems may alternately assume the roles of client or server from time to time. In either event, the data is transferred between end systems over a communication channel comprising links with limited data capacity or bandwidth.

Figure 1:
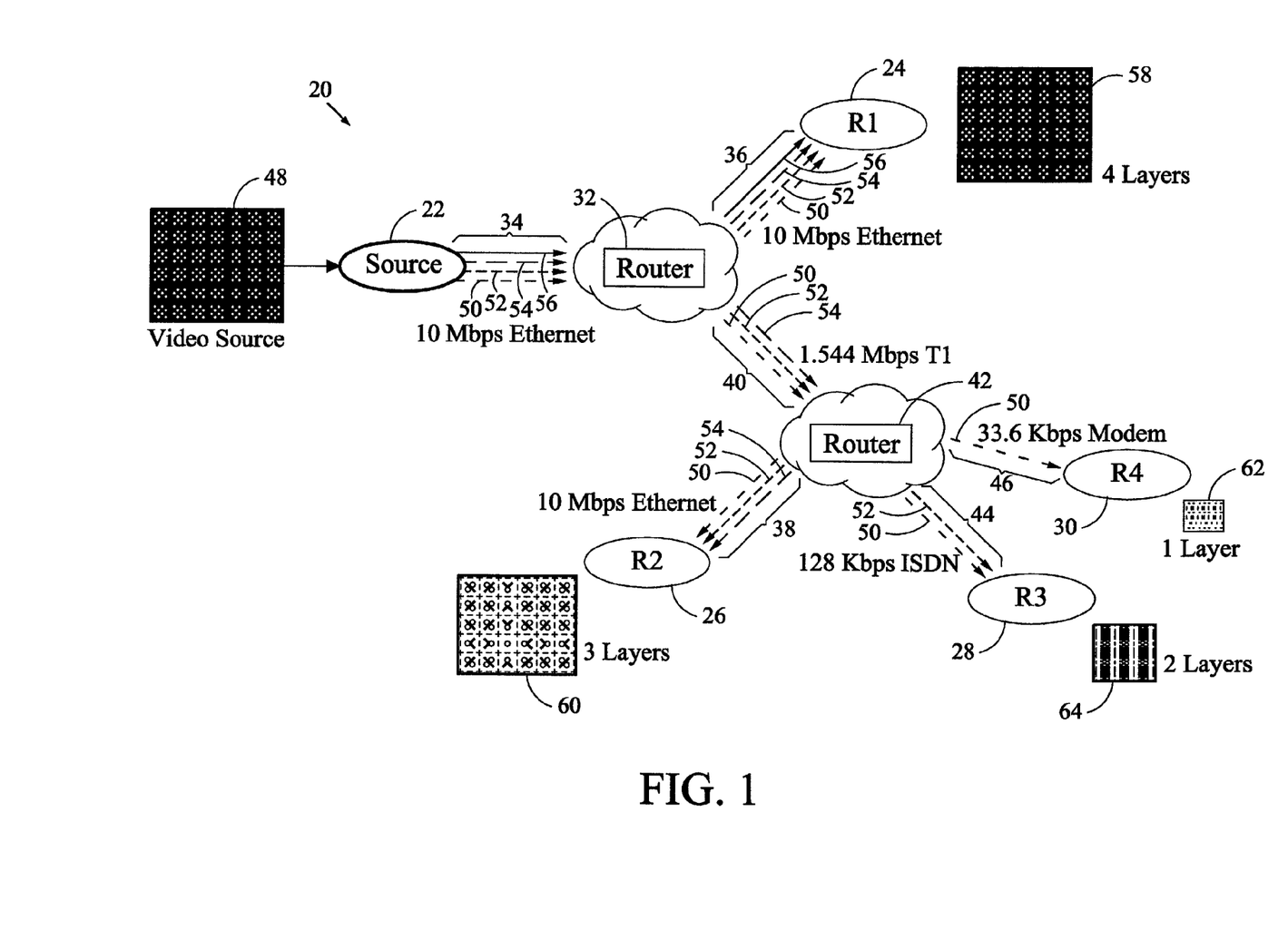
FIG. 1 is a schematic diagram of a network with multiple receivers having heterogeneous reception bandwidth.

Referring to FIG. 1, a complex data processing network 20, such as the Internet, comprises a number of connected networks providing a multiplicity of communication links between a source 22 and a plurality of receivers, for example receivers 24, 26, 28, and 30. Each communication channel between a source and an individual receiver or group of receivers is likely to have a reception bandwidth limitation that differs from the bandwidth of other receivers connected to the network. In other words, the bandwidth of the network is heterogeneous. For example, the exemplary source 22 is connected to a first router 32 by a 10 Mbps Ethernet connection 34 (indicated by a bracket). An exemplary first receiver 24 is also connected to the router 32 by a 10 Mbps Ethernet connection 36 (indicated by a bracket) and can receive data at approximately the rate of transmission by the source 22. On the other hand, an exemplary second receiver 26 is also connected to the network by a 10 Mbps Ethernet connection 38 (indicated by a bracket) but has a reception bandwidth that is limited by a 1.544 Mbps T1 link 40 (indicated by a bracket) between the first router 32 and a second router 42 in the communication channel. The reception bandwidth available to an exemplary third receiver 28 and an exemplary fourth receiver 30 are limited by the bandwidth of their respective local access connections to the network, a 128 Kbps ISDN line 44 (indicated by a bracket) and a 33.6 Kbps modem 46 (indicated by a bracket). Simultaneous transmission to all receivers at a single data rate is likely to be unsatisfactory for most of the receivers. Transmission at the lowest reception data rate would deprive receivers with higher reception bandwidth of the advantages of higher data rates. In the case of video, a higher data rate reduces the distortion of the received video improving its quality. On the other hand, transmission at a higher rate would cause packet loss and loss of quality for receivers with lower reception bandwidth.

Figure 2:
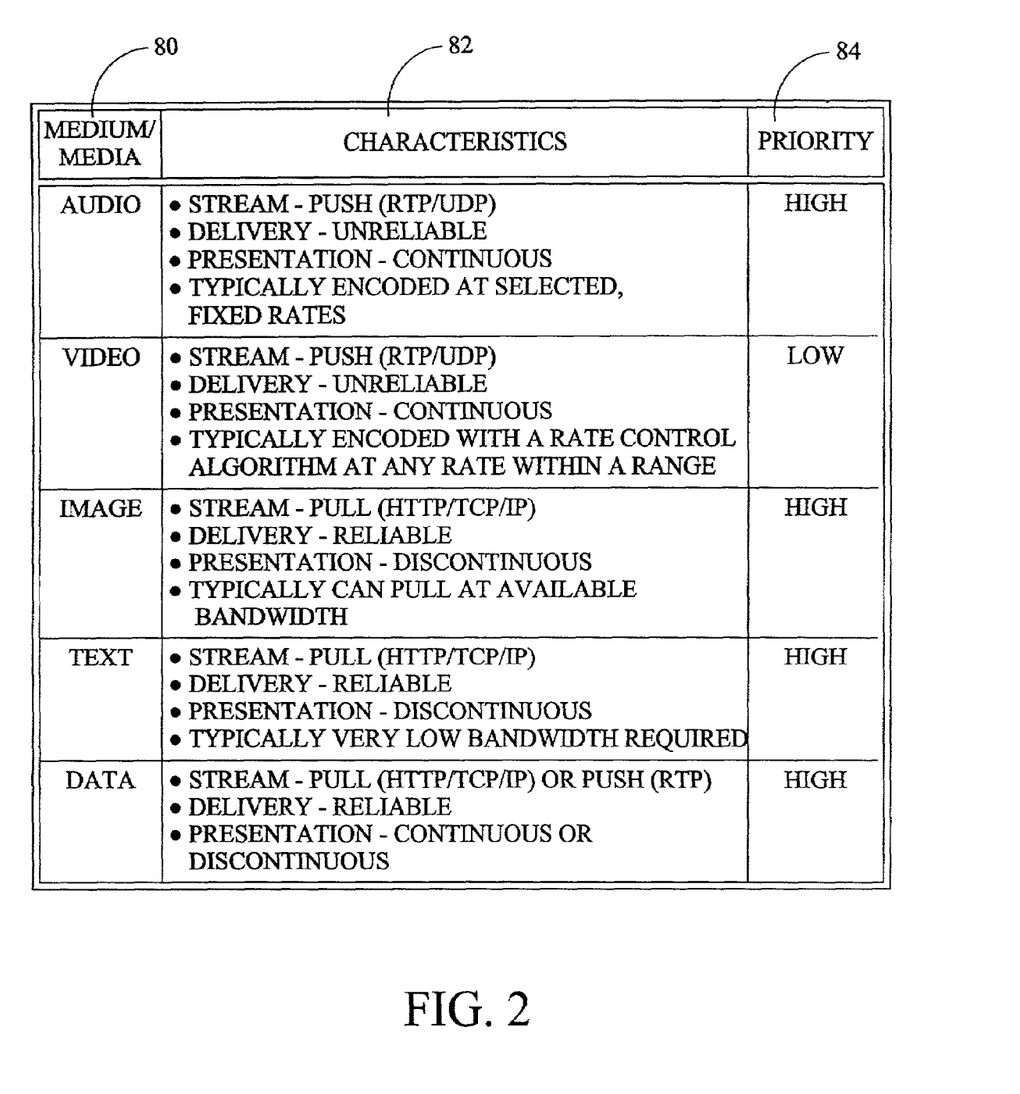
FIG. 2 is a table listing certain characteristics of several media commonly included in multimedia events.

In multimedia network sessions the heterogeneity of the network is a particular problem because multimedia events often require simultaneous transfer of data related to several different program elements or media having differing characteristics, delivery mechanisms, and priorities to multiple receivers connected to the network. For example, a lecture delivered as part of a distance learning activity may involve video, audio, image, data, and text elements. FIG. 2 lists certain exemplary characteristics 82 of several media 80 or elements that might be included in a typical multimedia network session and the communication processes used to transfer data for the medium during a session. For example, video and audio are typically transferred in a data stream "pushed" by a server while images and text are typically "pulled" by a client. The server controls the flow and rate of data transfer for data in a push medium data stream. Push protocols include Real-time Transport Protocol (RTP) for streaming media and SGI (Silicon Graphics Inc.) MediaBase for video on demand. On the other hand, the client controls the data transfer rate for a pull medium data stream by invoking a protocol such as Hypertext Transfer Protocol (HTTP) which is used for transferring images, text, and, in some cases, data.

In addition to differences in the identity of the entity controlling the transfer, some media may be continuously presented while other elements of the session are presented discontinuously in discrete units. For example, video and audio elements of a session must be presented continuously to provide acceptable communication. On the other hand, images are discrete elements that are presented only "occasionally." Further, the integrity and character of the multimedia event requires a different priority 84 for the delivery of the various media to an end system for presentation to a user. For example, a multimedia lecture may include slides delivered as images at appropriate points in the lecture. A high transmission priority to assure prompt reception of the slides is important to the effectiveness of the lecture. Multimedia sessions including audio and video typically require high data rates, but the data rates vary substantially as media are added or deleted from the session.

Layered multicast combining layered compression and transmission of a push medium provides a way of addressing the inherent bandwidth problems of a heterogeneous multipoint network connection. In a layered multicast, the source signal is divided into a plurality of layers representing incrementally increasing levels of quality. Layered multicast can be applied to data of any push medium suited to encoding in hierarchical layers but is typically applied to video. The greatest compression efficiency is utilized to create a base layer having a minimal level of quality and a data rate that is satisfactory to receivers having a threshold minimum reception bandwidth. Incrementally adding layers increases the bandwidth of the transmission and the quality of the multicast video.

For example, in the network 20 the source 22 may transmit video encoded from a video source information 48 in four layers; a base layer (0) 50, a second layer (1) 52, a third layer (2) 54, and a fourth layer (3) 56. Since the exemplary first receiver 24 has sufficient reception bandwidth, it can receive all four layers and display video 58 of quality equivalent to that of the video as encoded at the source 48. On the other hand, the T1 connection 40 limits the bandwidth at the second router 42 and only the first three layers (0, 1, and 2) 50, 52, and 54 are available at the second router 42. The exemplary second receiver 26 has sufficient reception bandwidth to receive all three layers 50, 52, and 54 available at the second router 42. Since less data is available at the second receiver 26 to reconstruct the video, it will somewhat distorted (lower quality) when compared to the video "as encoded" at the source. The reception bandwidth of the exemplary fourth receiver 30 is so limited by the modem connection 46 that it is able to receive only the base layer 50 for the lowest quality display 62, while the exemplary third receiver 28 can accept two layers (0 and 1) 50 and 52 for a somewhat better quality display 64. Heterogeneity is managed by locally degrading the quality of the received signal.

The Receiver-driven Layered Multicast (RLM) protocol and the Layered Video Multicast with Retransmissions (LVMR) protocol provide rate control for multicast receivers permitting a receiver to adapt its reception data rate to the local reception bandwidth as determined by the static homogeneity of the network link and dynamic variations in link bandwidth produced by communication channel congestion. During a layered multicast the source or server 22 transmits each layer of the layered signal to a separate multicast IP (Internet Protocol) group address and takes no active role in allocating bandwidth. On the other hand, by joining or leaving a multicast group and accepting or rejecting data from the multicast group address, each receiver adapts its reception to the locally available bandwidth by adding or dropping layers of the transmission. The receiver may join a new group and add a layer of the multicast if spare (additional unused) bandwidth in the network links between the receiver and the source is apparent. When the receiver senses congestion in the communication channel, it drops a layer of the transmission.

When the receiver subscribes to a layer requiring more bandwidth than is available on the links of the network path to the receiver, the communication channel will become congested causing data packets to be dropped from the data stream degrading the quality of the received data. Data packet loss can be detected by the receiver and used to instigate dropping of a layer. On the other hand, available, but unused, reception bandwidth is not readily detectable. A layered multicast receiver indirectly detects spare reception bandwidth by periodically performing a "join experiment" in which the receiver adds the next layer and then measures the effect on data packet loss to determine if it is oversubscribed. The receiver continues accepting data packets from the added layer unless or until it determines that the packet loss is unacceptable. If packet loss becomes unacceptable either as a result of over subscription or dynamic conditions in the communication channel, the last added layer is dropped and the receiver waits for an interval before repeating the experiment. On the other hand, if packet loss remains acceptable, the receiver waits for a period and then performs another "join experiment" to determine if it can add the next hierarchical layer.

Figure 3:
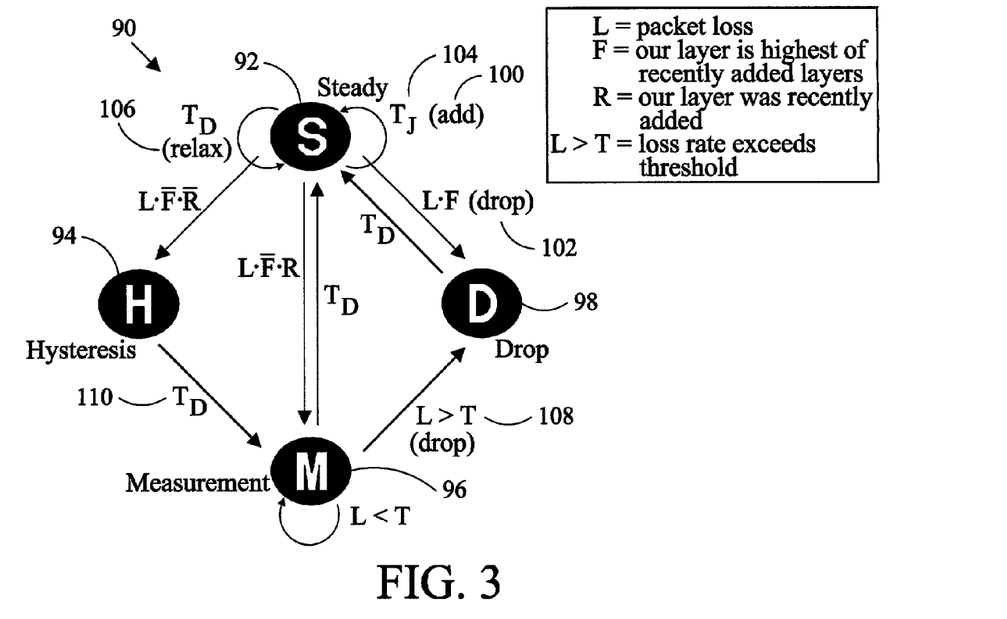
FIG. 3 is a diagram of the operation of state machine controlling reception of a layered encoded medium.

Referring to FIG. 3, when operating according to the RLM protocol, each receiver utilizes a state machine 90 to control the join experimentation. The state machine 90 has four states: a steady-state 92, a hysteresis state 94, a measurement state 96, and a drop state 98. State transitions by the machine 90 are the result of either packet loss or expiration of a time interval. As a result of a state transition, the receiver can take an action as indicated parenthetically in proximity of the transition. An "add" action 100 implies subscription to the next higher data rate layer in the layered multicast hierarchy and a "drop" action 102 implies dropping the highest data rate layer to which the receiver is currently subscribed and resetting a "join" timer ($T_j$) 104 that determines the interval that will pass before the receiver will again attempt to join the dropped layer. The relax action 106 resets the join timer ($T_j$) 104 to decrease the interval before attempting to join the next layer. The rate of packet loss (L) either due to a sudden loss of a single packet or an estimated sustained rate of loss is compared to a threshold rate (T). Packet loss exceeding the threshold (L>T) 108 causes the receiver to drop the last layer. The hysteresis state 94 provides a means of absorbing transient congestion periods. This prevents a receiver in steady state 92 from reacting to join-experiments carried out by other receivers or to transient network congestion. Measurement 96 is delayed by the period of a detection timer ($T_D$) 104 so congestion due to transient conditions resulting from a join-experiment will have time to dissipate.

Figure 4:
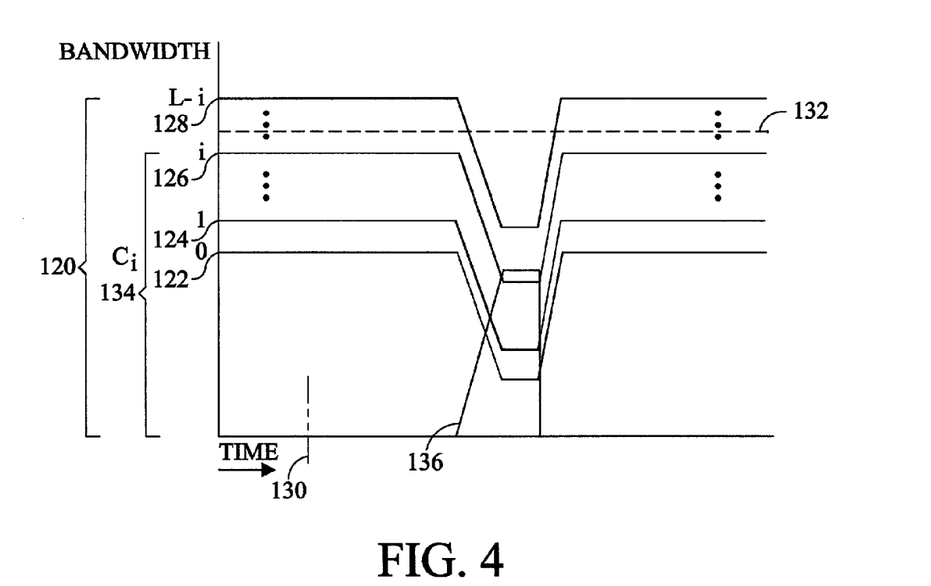
FIG. 4 is a graphical representation of bandwidth allocation during a multimedia event.

Referring to FIG. 4, during a multimedia session a server is encoding a push medium 120 (indicated by a bracket), for example video, using a layered scheme. The push medium 120 is transmitted over the network as a base layer (0) 122 and a plurality of hierarchical, enhancement layers (1, ..., i, ..., L-1) 124, 126, and 128, respectively. The data rates for layers of the push medium 120 are $R_0$, $R_1$, ..., $R_i$, ... $R_{L-1}$, respectively. At any time, a receiver or client is subscribed to the lowest i layers of the transmission having a combined data rate $C_i$ 134 (indicated by a bracket) that does not exceed the reception bandwidth for the receiver 132. Operating under the RLM protocol, the client may add a layer as a function of the success of a join experiment or drop a layer as the result of packet loss. Since the client is receiving the push medium stream only, the total reception data rate, $C_i$, 134 for the client equals the sum of the individual data rates for i layers being received or:

$$C_i = \sum_{k=0}^{i} R_k$$

When the server begins to transmit a pull medium 136, for example an image, the total data rate at the client equals the sum of the rates for the push medium layers and the pull medium. However, the total data rate received by an individual client is limited to its reception bandwidth 132.

TCP/IP is commonly used to provide reliable delivery of image, text, and data (pull media) on the Internet. TCP/IP includes a congestion control mechanism and transmits data at the maximum data rate available. Since the receiver is receiving layered push medium data at near the reception bandwidth, the data rate of the TCP/IP transfer of the pull medium will be suppressed and the latency in transferring the image or other pull element will be extended. The present inventor concluded that to preserve the character of the multimedia session for network clients with heterogeneous reception bandwidth, the bandwidth of the multimedia session should be reallocated during the transmission of a pull medium. In addition, the inventor concluded that the performance of the system could be further improved by suppressing attempts by receivers to increase the number of push medium layers being received during transmission of the pull medium.

A cost function evaluates a particular solution to a problem to determine how well the solution solves the problem. The lower the value of the cost function, the better the solution to the problem. In the bandwidth allocation system of the present invention, minimization of a cost function is used to optimally reallocate the data rates of layers of a variable data rate push medium during transmission of a pull medium to optimize the bandwidth utilization and maintain the relative priorities of media to the multimedia session.

Exemplary cost functions relating distortion of a variable data rate push medium and the latency of a pull medium are:

$Cost = D*T_j + KT_j$ $Cost = D + KT_j$ where:
D=distortion of the variable data rate push medium
K=a fairness criterion
$T_j$=latency of the pull medium and $T_j = (R_{pull}*n_j)$ where:
$R_{pull}$=data rate of the pull medium
$n_j$=number of bits of the pull medium The cost function relates the goals of simultaneously minimizing the distortion of the variable rate push medium and the latency of the pull medium. The relative contribution of each of the goals is established by the fairness criterion (K) which permits weighting of the relative importance of the distortion and the latency. Appropriate weighting may be based on media priority specific to a particular application.

An analytical solution to the cost function requires an expression relating data rate and distortion of the medium. This expression is the result of the design of a specific encoder. If such an expression is available for the specific encoder the solution may be obtained analytically. If not, a solution can be determined by applying curve fitting to the decoder output.

When the server begins transmitting the pull medium, the encoding rates for the push medium layers are adjusted to encode the push medium at a combined rate of:

$$C_i' = C_i - (R_{pull\_opt})_i$$

where $(R_{pull\_opt})_i$ is the optimized pull medium data rate resulting from the minimization of the cost function for the particular encoder.

To maintain the relative priority of the push medium layers, the data rate for each layer of the push medium is a function of the combined data rate for all received layers and the combined data rates for all lower priority layers:

$$R_0' = C_0'$$

$$R_1' = C_1' - C_0'$$

$$R_i' = C_i' - C_{i-1}'$$

$$R_{L-1}' = C_{L-1}' - C_{L-2}'$$

When the transmission of the pull medium begins 136, the push medium server switches to encode the L layers 122, 124, 126 and 128 of the push media at the reduced rates. The encoding rates of the layers are switched back to their respective rates before reduction when the time for transmission of the pull medium has expired. If all of the bits of the pull medium are transmitted in a period inversely proportional to the available client reception bandwidth for the pull media, the transmission time equals:

$$t_i = \max\left(\frac{G*n_j}{C_i - C_i'}, T_{\min}\right)$$

where:
  $n_j$=the number of transmitted bits of the pull medium
  G=adjustment constant
  $T_{min}$=a minimum time for the rate switch The adjustment constant G permits adjustment of the transmission time interval to reflect the fact that the actual time to transmit each pull medium will vary for each client and protocol used to transmit the medium. For example, HTTP running on top of TCP/IP initially transfers data at a slow rate but quickly permits the rate to increase to the limit of the available bandwidth. Further, each client of each multicast group will have a slightly different total reception bandwidth 132 and therefore require a slightly different transmission time.

In addition to the adjustment of the push medium layer encoding rates by the server, the present inventor concluded that pull medium reception could be further improved by action at the client. Operating under the RLM and LVMR protocols, the receiver or client can perform a join experiment and attempt to add a push medium layer at any time. Since the client will reach its optimal subscription level rapidly, a layer that was added shortly before the onset of the pull medium transmission is most likely the result of a join experiment that will ultimately fail. However, the congestion produced by a failed experiment will delay the pull medium transfer. Therefore, in the method of the present invention the highest subscribed layer of the push medium is dropped when pull medium reception begins if the push layer was "recently" added or if congestion has caused the state machine 90 of the receiver to be in a state other than the steady state 92 or the drop 98 state. (If the state machine is in the drop state 98 it will progress to the steady state 92.) To determine if a layer has been "recently" added when the pull medium reception begins, each client maintains a variable for a timer that is initiated when a push layer is added. When reception of the pull medium begins, the receiver compares the value of the variable to a threshold to determine if the last added layer was "recently" added. After dropping the highest layer, the state machine 90 of the receiver will advance to the "drop" state 98 and then to the steady state 92 when the drop timer $T_D$ expires. This ensures that the state machine 90 will not overreact and drop additional layers. Once in the steady state 92 further join experiments are suppressed until the pull media reception time expires.

With the method of the present invention, the data rates of the layers of a push medium of a multimedia session are reduced at the initiation of transmission of a pull medium. This increases the portion of the reception bandwidth available for transfer of the pull medium promoting more rapid transfer of the pull medium. Further, suppressing join experiments during pull medium transmission reduces the likelihood of communication channel congestion which otherwise would reduce the bandwidth for the pull medium and increasing the latency of the transfer.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of encoding data comprising the steps of:
   (a) encoding data of a first layer of a first medium at a first rate;
   (b) encoding data of a second layer of said first medium at a second rate; and
   (c) in response to transmission of a datum of a second medium, reducing at least one of said first and said second rates in accordance with a relationship of a latency of said second medium and a quality of said first medium.

2. The method of claim 1 wherein said relationship of said latency of said second medium and said distortion of said first medium is determined by a cost function.

3. The method of claim 1 wherein said first medium is a push medium.

4. The method of claim 1 wherein said second medium is a pull medium.

5. The method of claim 1 wherein said first medium is encoded for transmission according to a Real-Time Transport protocol.

6. The method of claim 1 wherein said second medium is transmitted according to a Hyper-Text Transfer Protocol.

7. The method of claim 1 further comprising the step of increasing an encoding rate for said first layer of said first medium and said second layer of said first medium upon completion of said transmission data of said second medium.

8. The method of claim 1 further comprising the step of increasing an encoding rate for said first layer of said first medium and an encoding rate of said second layer of said first medium upon expiration of a time interval for said transmission of data of said second medium.

9. A method of transferring data comprising the steps of:
(a) receiving data of a first layer of a push medium;
(b) receiving data of a second layer of said push medium;
(c) in response to transmission of a datum of a pull medium, discontinuing said reception of said data of said second layer of said push medium.

10. The method of claim 9 wherein the step of discontinuing reception of said data of said second layer of said push medium in response to transmission of said datum of said pull medium, comprises the step of discontinuing reception of said data of said second layer in the event of at least one of a loss of data exceeding a threshold data loss and reception of said data of said second layer for a interval less than a threshold reception interval when said transmission of said datum of said pull medium is initiated.

11. The method of claim 9 further comprising the step of suppressing an attempt to resume said discontinued reception of data of said second layer during transmission of said pull medium.

12. The method of claim 9 wherein the step of receiving said data of said first and said second layers of said push medium comprises the step of receiving data transmitted according to a Real-Time Transport protocol.

13. The method of claim 9 wherein said transmission of said datum of said pull medium is accomplished according to a Hyper-Text Transfer Protocol.

14. A method of data transfer for a network comprising the steps of:
(a) transmitting data of a first layer of a first medium at a first rate;
(b) transmitting data of a second layer of said first medium at a second rate;
(c) in response to transmission of a datum of a second medium, reducing said first rate as a function of a latency of said second medium;
(d) in response to transmission of said datum of said second medium, reducing said second rate as function of said reduced first rate; and
(e) discontinuing reception of data of said second layer of said first medium in the event of at least one of a loss of data exceeding a threshold data loss and reception of said data of said second layer for an interval less than a threshold reception interval when said transmission of said second medium is initiated.

15. The method of claim 14 wherein said first medium is a push medium.

16. The method of claim 14 wherein said second medium is a pull medium.

17. The method of claim 14 further comprising the step of increasing of said rates for said first layer and said second layer of said first medium upon completion of said transmission of data of said second medium.

18. The method of claim 14 further comprising the step of increasing said rate for said first layer and said rate for said second layer of said first medium upon expiration of a time interval for said transmission of data of said second medium.

19. The method of claim 14 further comprising the step of suppressing an attempt to resume said discontinued reception of said data of said second layer of said first medium during transmission of said second medium.

20. The method of claim 14 wherein said data of said first medium are transmitted with a Real-Time Transport protocol.

21. The method of claim 14 wherein said datum of said second medium is transmitted with a Hyper-Text Transfer Protocol.

\* \* \* \* \*

UNITED STATES PATENT AND TRADEMARK OFFICE
CERTIFICATE OF CORRECTION

PATENT NO. : 6,987,728 B2
APPLICATION NO. : 09/768844
DATED : January 17, 2006
INVENTOR(S) : Deshpande It is certified that error appears in the above-identified patent and that said Letters Patent is hereby corrected as shown below:

Column 7,
Line 25, change "$R_0'=C_0'$" to -- $R'_0=C'_0$ --.
Line 27, change "$R_1'=C_1'-C_0'$" to -- $R'_1=C'_1-C'_0$ --.
Line 29, change "$R_i'=C_i'-C_{i-1}'$" to -- $R'_i=C'_i-C'_{i-1}$ --.
Line 31, change "$R_{L-1}'=C_{L-1}'-C_{L-2}'$" to -- $R'_{L-1}=C'_{L-1}-C'_{L-2}$ --.

Signed and Sealed this

Twenty-seventh Day of June, 2006

JON W. DUDAS
*Director of the United States Patent and Trademark Office*